US007508546B2

(12) United States Patent
Shimoji et al.

(10) Patent No.: US 7,508,546 B2
(45) Date of Patent: Mar. 24, 2009

(54) MEDICAL IMAGE RECORDING APPARATUS, MEDICAL IMAGE CORRECTING METHOD AND RECORDING MEDIA

(75) Inventors: Masaya Shimoji, Hachioji (JP); Masayuki Nakazawa, Hachioji (JP); Akira Taguchi, Hachioji (JP); Akira Yamano, Hino (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 801 days.

(21) Appl. No.: 11/051,019

(22) Filed: Feb. 4, 2005

(65) Prior Publication Data

US 2005/0179714 A1 Aug. 18, 2005

(30) Foreign Application Priority Data

Feb. 13, 2004 (JP) ............................ 2004-037176
Feb. 16, 2004 (JP) ............................ 2004-038831

(51) Int. Cl.
*H04N 1/60* (2006.01)
*G06F 15/00* (2006.01)
*G06K 1/00* (2006.01)
*H04N 1/405* (2006.01)

(52) U.S. Cl. ........................................ 358/1.9; 358/3.1

(58) Field of Classification Search .............. 347/1-30; 358/1.1, 1.9, 3.1
See application file for complete search history.

(56) References Cited

U.S. PATENT DOCUMENTS 6,670,977 B2 * 12/2003 Nakanishi et al. ........... 347/228
6,784,980 B2 * 8/2004 Sumi et al. .................. 355/405
2003/0091347 A1 * 5/2003 Goto et al. .................. 396/564

FOREIGN PATENT DOCUMENTS

JP 06-233134 8/1994
JP 2003-136782 5/2003

* cited by examiner

*Primary Examiner*—Douglas Q Tran
(74) *Attorney, Agent, or Firm*—Lucas & Mercanti, LLP

(57) ABSTRACT

In medical image recording apparatus, exposure unit forms a latent image on film by exposing based on a testing exposure data for correction of density characteristics of the leading edge and/or the trailing edge of film, and heat developer heat-develops the latent image and records it on film, and density measurer measures the density characteristics of the heat-developed testing exposure image, and then, controller determines the correction areas of the leading edge and/or the trailing edge of film based on the result of the density measurement and corrects the density characteristics of the leading edge and/or the trailing edge of film for the correction areas at the image recording stage of a diagnostic image data.

17 Claims, 11 Drawing Sheets

MEDICAL IMAGE RECORDING APPARATUS, MEDICAL IMAGE CORRECTING METHOD AND RECORDING MEDIA

BACKGROUND OF THE INVENTION

This invention relates to a medical image recording apparatus, a medical image correcting method and recording media.

Generally, when a diagnosis of a medical image obtained from an image creating apparatus such as CR(Computed Radiography) apparatus, FPD(Flat Panel Detector), CT(Computed Tomography) and MRI(Magnetic Resonance Imaging) is carried out, a method of observing hardcopies of record of medical information recorded on transmission record media or reflection record media is often used. As an image recording apparatus recording medical images by forming them on recording media, the method of recording by laser exposure on transmission recording media employing silver salt recording material to form an image is often used. As an image recording apparatus, there is known a dry process type image recording apparatus, which conducts photosensitive heat developing image recording by using a photosensitive heat-developable recording material and a photothermosensitive recording material as well as an image recording apparatus using a silver salt recording material which needs a conventional wet type process. These recording materials (heat developable photosensitive ones) will be called films hereafter.

Regarding the abovementioned image recording apparatus, in order to output an image having a good gradation, wedge patterns (test pattern) of plural densities are exposed on the film when films are loaded or at constant intervals, and based on the result of the measurement of the density of the obtained pattern image by a densitometer, a calibration is carried out to correct the relationship between an input image data and the exposure amount of laser. For example, there is considered a structure which automatically corrects dispersion of photosensitive characteristics of heat developable photosensitive film and change of development characteristics of an apparatus (for example, see Patent Document 1).

The density of developed film is affected by the quantity of added heat by a heat roller to the exposed film and by timing of cooling. Especially it is known that the density is unstable on the leading edge and the trailing edge of a film because of the structure of film transportation of the heating means. Therefore, there is considered the structure, wherein a film on which a patch of single density is recorded in the center is used, and the rotating speed of heat roller is adjusted based on the result of the density measurement of the patch carried out to every film so as to correct dispersion of the sensitivity characteristics of the film (for example, see Patent Document 2).

[Patent Document 1] TOKKAIHEI6-233134

[Patent Document 2] TOKAI2003-136782

However, the conventional calibration can not carry out simultaneously the correction of tone characteristics by wedge patterns having plural density levels and the density correction of the leading edge and/or the trailing edge of a film.

SUMMARY OF THE INVENTION

An objective of this invention is to perform simultaneously the correction of tone characteristics and the density correction of the leading edge and/or the trailing edge of a heat developable photosensitive film at the image recording stage.

Another objective of this invention is to determine the correction areas of the leading edge and/or the trailing edge of a heat developable photosensitive film and to correct the density.

Another objective of this invention is to apply the above-stated density correction to films of a plurality of different sizes by determining the correction areas and the correcting exposure amount for each film size individually to obtain constant density of the leading edge and/or the trailing edge for films of different sizes.

The objectives mentioned above can be achieved by the structure detailed below.

Structure 1) is a medical image recording apparatus comprising a film transporting device to transport a heat developable photosensitive film one at a time, an exposing device to form a latent image on the film based on predetermined testing exposure data or diagnostic image data, a heat developing device to heat-develop the latent image on the film, for visualizing the latent image, a density measuring device to measure the density of the visualized image after the heat development, and a controlling device to control the film transporting device, the exposing device, the heat developing device and the density measuring device, wherein the testing exposure data comprise first test data to form a first test image, the exposing device forms a latent image of the first test image on at least one of a leading edge portion and a trailing edge portion of a film based on the first test data, the heat developing device visualizes the first test image, the density measuring device measures the density of the first test image on the film and the controlling device determines a correction area on the at least one of the leading edge portion and the trailing edge portion of the film based on the result of the density measurement of the first test image and corrects the density characteristic of an area of another film corresponding to the determined correction area when a medical image is recorded on the another film based on diagnostic image data.

Structure 2) is the medical image recording apparatus described in Structure 1), wherein the testing exposure data comprise second test data including test data to form a second test image having the same density with the first test image for detecting a density change on the at least one of the leading edge portion and the trailing edge portion of the film, the second test image is formed in a middle portion of the film, and the controlling device corrects the density characteristic of the at least one of the leading edge portion and the trailing edge portion of the another film based on the comparison of the result of density measurement of the first test image on the film and the result of the density measurement of the second test image on the film.

Structure 3) is the medical image recording apparatus described in Structure 2), wherein the second test data comprise a plurality of wedge pattern data to form wedge pattern images for measurement of tone characteristics.

Structure 4) is the medical image recording apparatus described in Structure 3), wherein the controlling device creates a look up table for correction of tone characteristics based on the result of the density measurement of the wedge pattern images and calculates a correcting exposure amount of the density characteristic of the at least one of the leading edge portion and the trailing edge portion of the film based on the look up table.

Structure 5) is the medical image recording apparatus described in Structure 1), wherein the first test data comprise third test data to form a third test image on the leading edge portion and fourth test data to form a fourth test image next to the third test image, and the density of the third test image is lower than that of the fourth test image.

Structure 6) is the medical image recording apparatus described in Structure 1), wherein the correction areas on the at least one of the leading edge portion and the trailing edge portion of the film are determined based on heat developing characteristic of the heat developing device.

Structure 7) is the medical image recording apparatus described in Structure 1), wherein the medical image recording apparatus is adapted to record an image selectively on one of plural different sizes of heat developable photosensitive films, and wherein the controlling device determines the correction areas and correcting exposure amount for each film of different sizes respectively such that the density of each of the plural different sizes of heat developable photosensitive films is corrected.

Structure 8) is a method of correcting a medical image, comprising steps of forming a latent image of a first test image on at least one of a leading edge portion and a trailing edge portion of a heat developable photosensitive film based on first test data of testing exposure data, conveying the film to a heat developing device, developing the film for visualizing the first test image, measuring the density of the first test image on the film, determining a correction area on the at least one of the leading edge portion and the trailing edge portion of the film based on the result of the density measurement of the first test image; and correcting the density characteristic of an area of another film corresponding to the determined correction area when a medical image is recorded on the another film based on diagnostic image data.

Structure 9) is the medical image correcting method described in Structure 8), wherein the testing exposure data comprise second test data including test data to form a second test image having the same density with the first test image for detecting a density change on the at least one of the leading edge portion and the trailing edge portion of the film, the second test image is formed in a middle portion of the film in the forming step, and the density characteristic of the at least one of the leading edge portion and the trailing edge portion of the another film is corrected based on the comparison of the result of density measurement of the first test image on the film and the result of the density measurement of the second test image on the film.

Structure 10) is the medical image correcting method described in Structure 9), wherein the second test data comprise a plurality of wedge pattern data to form wedge pattern images for measurement of tone characteristics.

Structure 11) is the medical image correcting method described in Structure 9), wherein a look up table for correction of tone characteristics is created based on the result of the density measurement of the wedge pattern images and a correcting exposure amount of the density characteristic of the at least one of the leading edge portion and the trailing edge portion of the film is calculated based on the look up table.

Structure 12) is the medical image correcting method described in Structure 8), wherein the first test data comprise third test data to form a third test image on the leading edge portion and fourth test data to form a fourth test image next to the third test image, and the density of the third test image-is lower than that of the fourth test image.

Structure 13) is the medical image correcting method described in Structure 9), wherein the correction areas on the at least one of the leading edge portion and the trailing edge portion of the film are determined based on heat. developing characteristic of the heat developing device.

Structure 14) is the medical image correcting method described in Structure 8), wherein an image is recorded selectively on one of plural different sizes of heat developable photosensitive films, and wherein the correction areas and correcting exposure amount are determined for each film of different sizes respectively such that the density of each of the plural different sizes of heat developable photosensitive films is corrected.

Structure 15) is a recording medium readable by a computer and for storing predetermined data of testing exposure data to be recorded on a heat developable photosensitive film, the testing exposure data comprising first test data to form a first test image for detecting the density characteristics of at least one of a leading edge portion and a trailing edge portion of a heat developable photosensitive film, second test data including test data to form a second test image having the same density with the first test image, wherein the second test image is formed in a middle portion of the film, the first test data including third test data to form a third test image on the leading side and fourth test data to form a fourth test image next to the third test image, wherein the density of the third test image is lower than the density of the fourth test image.

Structure 16) is the recording medium described in Structure 15), wherein the testing exposure data comprise plural wedge pattern data for measuring tone characteristics.

Structure 17) is the recording medium described in Structure 16), wherein the plural wedge pattern data comprise the test data having the same density with the first test image for measurement of density change of the at least one of the leading edge portion and the trailing edge portion of the film.

According to the above structures, the following advantages can be obtained.

After film is exposed, heat-developed and applied with density measurement based on a testing exposure data including the first test data and the second test data, tone characteristics and the density characteristics of the leading edge and/or the trailing edge of a film at the recording stage of diagnostic image data is corrected based on the result of the density measurement of a testing exposure image, and therefore, tone characteristics at the recording stage of diagnostic image data and the density characteristics of the leading edge and/or the trailing edge of the heat developable photosensitive film can be done at the same time. Therefore, it is possible that the correction can be done with only one film.

Based on density measurement of a testing exposure image including the first test image, density characteristics of the leading edge and/or the trailing edge at the recording stage of diagnostic image data is corrected for correction areas of the leading edge and/or the trailing edge of the film, and therefore, the correction areas of the leading edge and/or the trailing edge of the heat developable photosensitive film can be determined and the density correction can be done accurately and efficiently.

By means of a step wedge part for tone characteristics measurement, tone characteristics at the image recording stage of diagnostic image data can be corrected accurately, and by means of the prescribed density parts for the leading edge and/or the trailing edge of a film, the density of the leading edge and/or the trailing edge of the film at the image recording stage of diagnostic image data can be corrected accurately.

Because a density characteristics of the leading edge and/or the trailing edge of a film is corrected comparing the result of density measurement of the leading edge and/or the trailing edge of the film with the result of density measurement of a designated density part in the middle of the wedge patterns of a film, the difference (correcting amount of density) between a density which should be maintained (the density to be recreated) and the actual density can be detected and the density correction for the leading edge and/or trailing edge of the film can be done more accurately.

Because a correcting exposure amount of density characteristics of the leading edge and/or the trailing edge of a film is calculated based on a look up table for tone characteristics correction, the density of the leading edge and/or the trailing edge of a film at the image recording stage of diagnostic image data can be corrected accurately based on the correcting exposure amount.

Because the density of the third test image is lower than that of the fourth test image, the density correction of the leading edge of a film can be done more accurately.

Because the correction area of the leading edge and/or trailing edge is determined by the heat developing characteristics of heat developing means, the density correction of the leading edge and/or trailing edge can be done more accurately.

DETAILED DESCRIPTION OF THE PREFERRED EMBODIMENT

Figure 1:
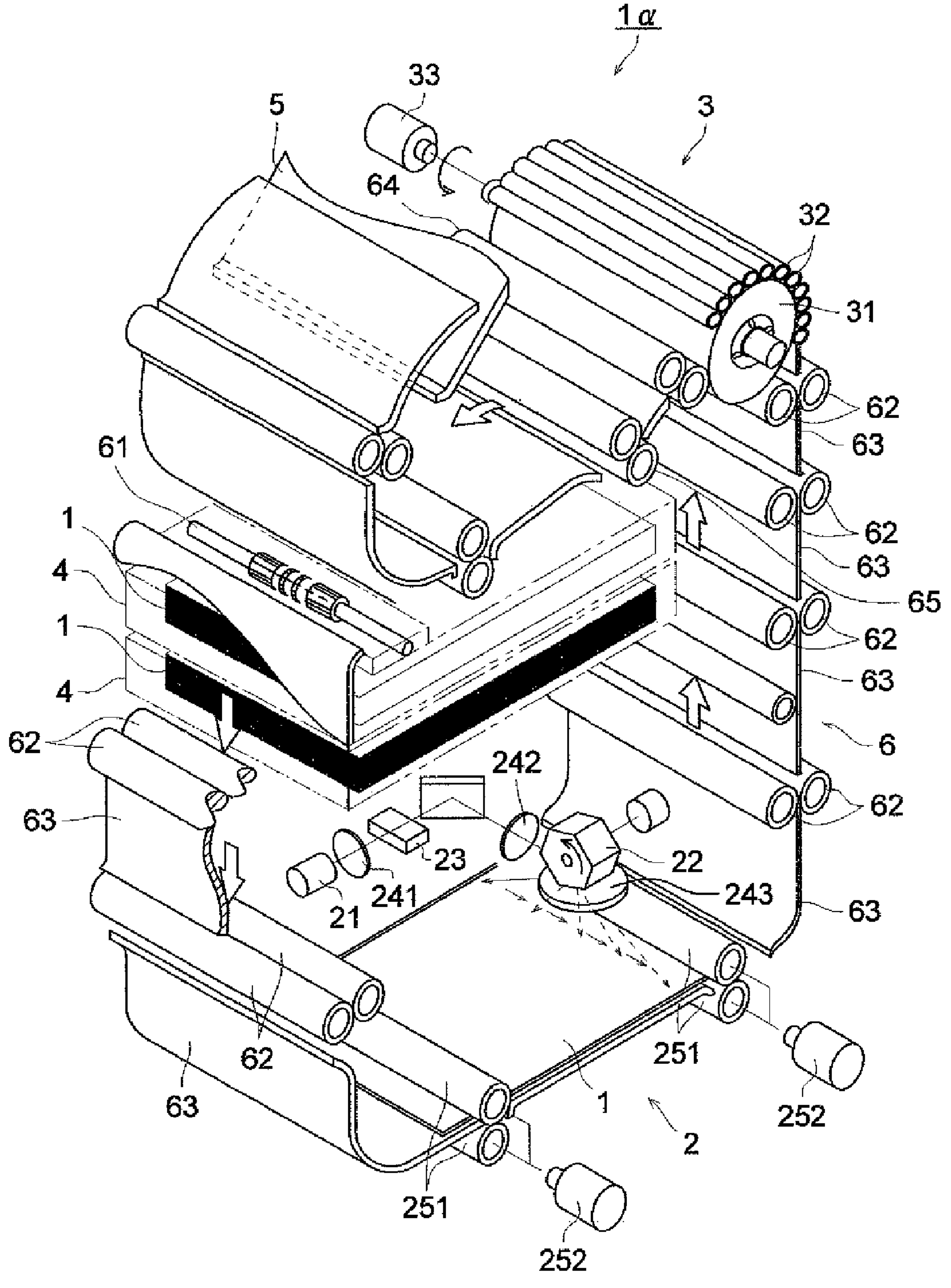
FIG. 1 is a schematic view showing a structure of a medical image recording apparatus of an embodiment related to the invention.

An embodiment related to the invention will be explained in detail as follows, referring to the drawings. Firstly, the structure of a medical image recording apparatus 1α of the embodiment will be explained, referring to FIG. 1 through FIG. 4. In FIG. 1, a schematic diagram shows the structure of a medical image recording apparatus related to the embodiment.

As shown in FIG. 1, medical image recording apparatus 1α is composed of exposure means 2 forming a latent image by irradiating laser for exposure on film 1 of a heat developable photosensitive type on which a photosensitive layer is formed on the surface, heat developing means 3 visualizing the latent image by heat-developing the exposed film 1, film storage 4 storing unexposed film 1, film exit 5 on which developed film 1 is ejected and film transporting means 6 transporting film 1 through film storage 4, exposure means 2, heat developing means 3 and film exit 5 in this order.

Film storage 4 is composed of a tray containing a plurality of piled unexposed films 1 and has a similar structure as a sheet tray of copying machine. In the embodiment, two film storages 4 are installed to store films 1 of different sizes. When all the films 1 in film storage 4 are used up, new ones are loaded by pulling out the trays.

Exposure means 2 is mainly composed of laser emitter 21 emitting a laser beam to be irradiated on film 1, scanning means 22 scanning the laser beam on the film 1 and illumination-intensity changing means 23 changing the intensity of illumination of a laser beam scanned on film 1 according to the data of image to be visualized. The laser emitter 21 emits a laser beam in the range of photosensitive wavelength of film 1, and semiconductor laser of emission wavelength of, for example, 810 nm can be used. For the scanning means 22, a polygon mirror is used in the embodiment. When a laser beam is irradiated on the polygon mirror while it is rotating at a prescribed speed, the laser beam is scanned in the lateral direction of the film 1 in a prescribed cycle.

The exposure means 2 has a precise feeding mechanism transferring film 1 while being exposed, in the lengthwise direction precisely. Because a laser beam is scanned in the lateral direction by the polygon mirror and film 1 is transferred in the lengthwise direction slowly by the precise feeding mechanism, the laser beam is scanned in the prescribed area on the film 1.

The illumination-intensity changing means 23 is composed of a light modulation element in the embodiment. As a light modulation element, an acoustooptic element (AOM), for example, can be used. The acoustooptic element generates diffracted light by a supersonic wave and modulates the intensity of the diffracted light by adjusting the intensity of the supersonic wave. Diagnosis image data to be outputted (hereinafter referred to as image data) are inputted from the outside through interface section 160 (not illustrated in FIG. 1) and are stored in memory 150 (not illustrated in FIG. 1). Image data in the memory 150 are read and sent to the illumination-intensity changing means 23. The illumination-intensity changing means 23 changes irradiation of a laser beam according to the image data when the laser beam is scanned on the film 1. As a result, the film 1 is exposed to make an image according to the image data.

The laser optical system is composed of light condensing lens 241 condensing a laser beam on illumination-intensity changing means 23, collimator lens 242 restoring the laser beam transmitted from illumination-intensity changing means 23 to a parallel beam and fθ lens 243 condensing a laser beam reflected on the polygon mirror to be a thin beam on film 1 regardless of a difference of the distance to film 1.

The precise feeding mechanism is composed of a pair of feeding rollers 251 feeding film 1 while the film 1 is pinched by the rollers and servomotor 252 driving feeding rollers 251. The servomotor 252 synchronizes with scanning means 22 to drive feeding roller 251 so that film 1 moves forward at a prescribed speed.

Heat developing means 3 conducts heat development in the embodiment. Specifically, the heat developing means 3 is composed of heat roller 31 and opposed rollers 32 which brings film 1 into contact with heat roller 31. As shown in FIG. 1, the heat roller 31 is a cylindrical roller having a relatively large diameter, and a heater is installed inside the heat roller 31. The opposed rollers 32 are slender, and a plurality of them are provided equally spaced (a prescribed pitch), along the circumference of the heat roller 31.

The heat roller 31 is equipped with motor 33 for driving (for transportation). Exposed film 1 is pinched between the heat roller 31 and the opposed rollers 32. When heat roller 31 is rotated by driving motor 33, the film 1 is fed by heat roller 31 and each of opposed rollers 32 while the film 1 is pushed against the circumferential surface of the heat roller 31. The film 1 is developed by the heat from heat roller 31 at this time.

Film transporting means 6 is composed of pick-up mechanism 61 feeding out film 1 by picking it up from a tray, plural paired pinch rollers 62 feeding film 1 by pinching it, an unillustrated motor for transportation driving pinch roller 62, guide plates 63, 63A and 63B (63A and 63B are not illustrated in FIG. 1) guiding the transportation of film 1, guide roller 64 guiding film 1 after heat development and transporting roller 65 guiding film 1 after heat development. In the transportation means 6, for example, for members contacting film 1 such as pinch rollers 62, special surface treatment is applied or a suitable material is selected so that film 1 may not be damaged or a stained. Film exit 5 is composed of a tray arranged on the upper surface of medical image recording apparatus 1α in this embodiment. Developed film 1 is ejected on the tray after transportation by film transporting means 6.

In the medical image recording apparatus 1α, density measuring means 7 (not illustrated in FIG. 1) which measures, after development, the density of a prescribed portion of film 1 (to be called density measurement portion later) exposed by a standard light amount, is equipped on the transportation passage between heat developing means 3 and film exit 5. According to the result of measurement of the density measuring means 7, the calibration control is conducted.

Figure 2:
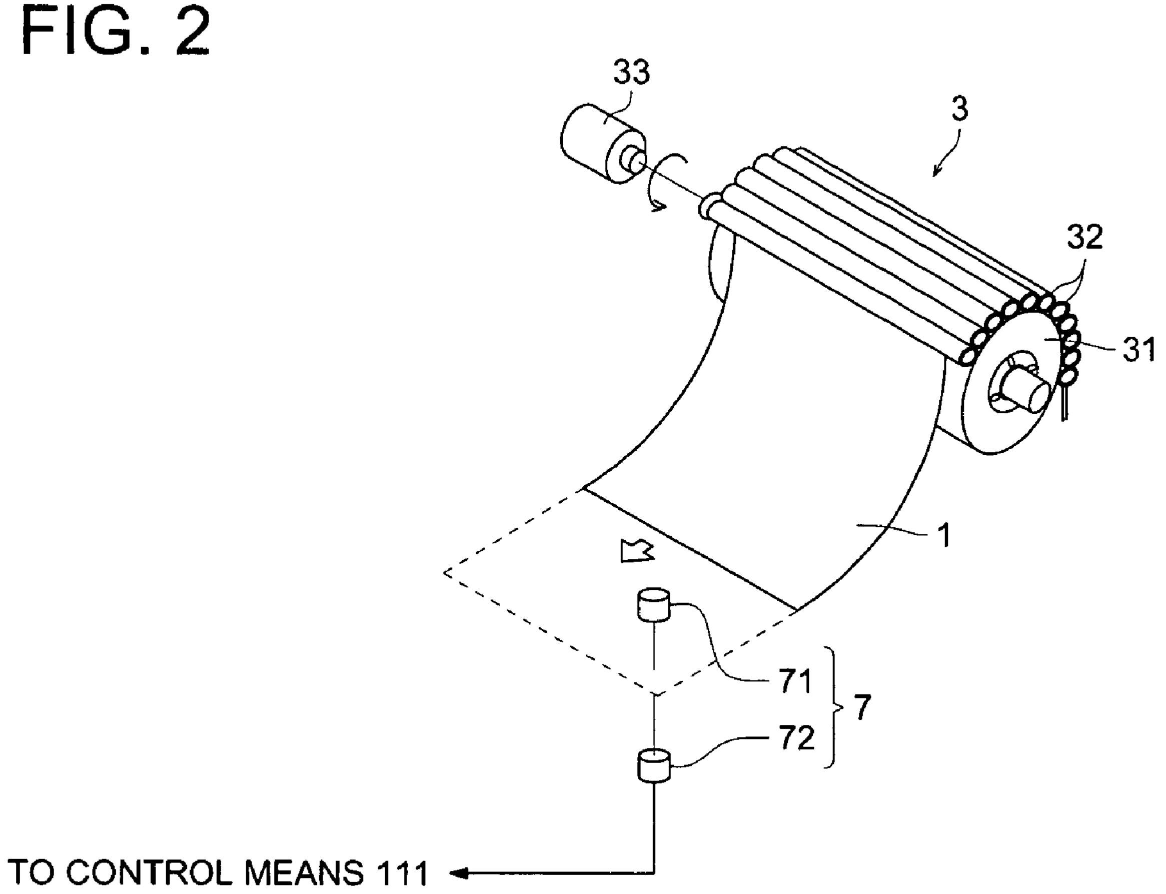
FIG. 2 is a schematic view showing a structure of density measuring means 7.

An explanation will be given on this point referring to FIG. 2. A general structure of the density measuring means 7 is shown in FIG. 2. The density measuring means 7 is composed of light emitter 71 emitting light toward the density measurement portion of film 1 after development and light receptor 72 receiving light coming from light emitter 71, which has penetrated through the density measurement portion.

The density measuring means 7 is installed on a position, where the heated film 1 has cooled down to under the prescribed temperature and the development process has stopped to determine the density on the downstream side of the heat developing means 3 shown in FIG. 2. A film passage detecting sensor is installed between heat developing means 3 and density measuring means 7, and the density measurement starts with a prescribed time lag after the detection of the passage of film 1. The result of the measurement (output of density detecting transmission sensor 72) is transmitted to control means 111 as a digital signal via AD converter.

Figure 3:
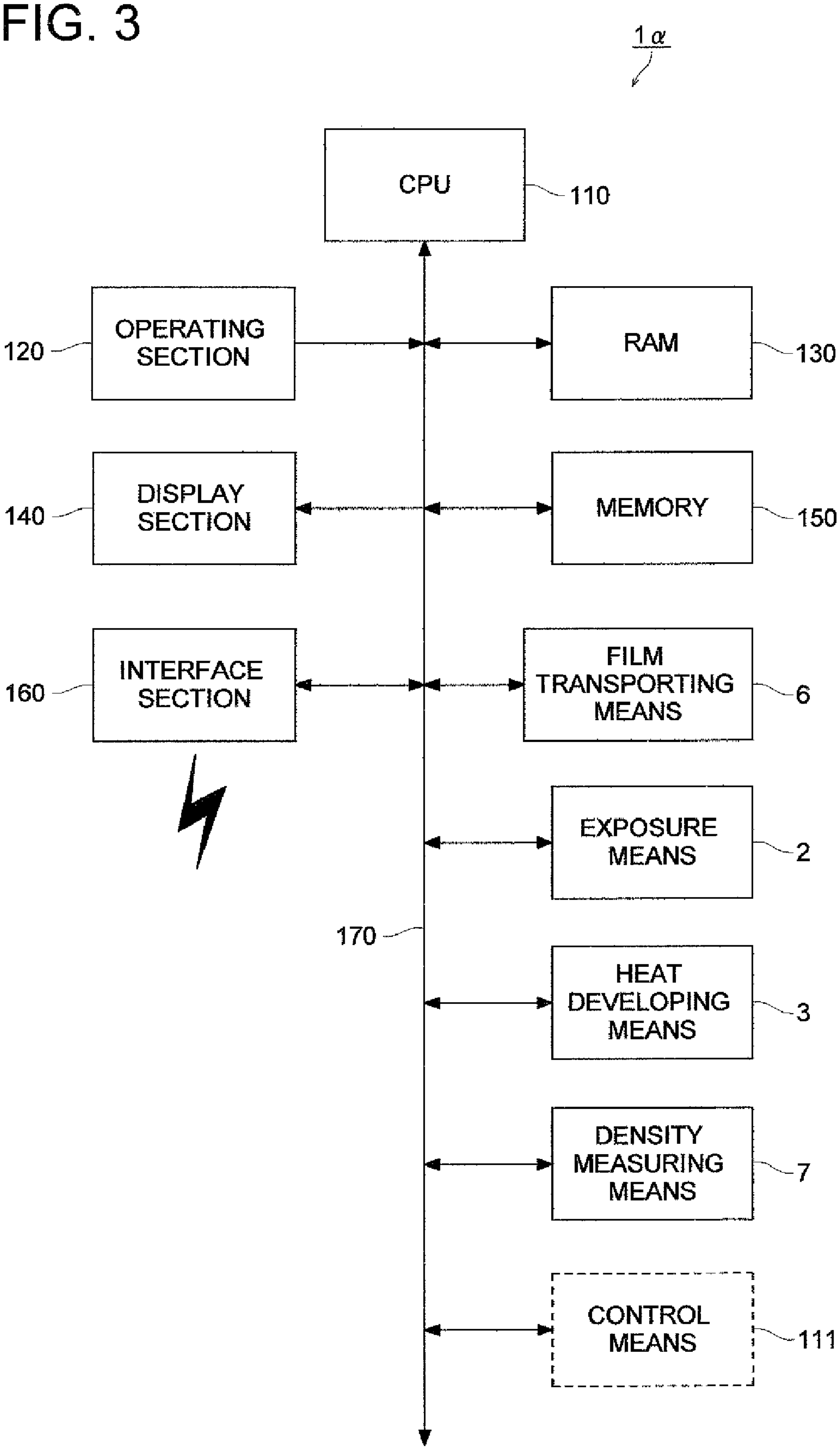
FIG. 3 is a diagram showing an internal structure of medical image recording apparatus 1α.

Next, an explanation about the controlling structure of medical image recording apparatus 1α will be given referring to FIG. 3. The internal structure of the medical image recording apparatus 1α is shown in FIG. 3. The medical image recording apparatus 1α is composed of CPU (Central Processing Unit) 110, operating section 120, RAM (Random Access Memory) 130, display section 140, memory 150, interface section 160, film transporting means 6, exposure means 2, heat developing means 3 and density measuring means 7, and each part is connected to bus 170.

The CPU 110 carries out a controlling of each part in medical image recording apparatus 1α. CPU 110 develops a designated program among system programs and application programs of each kind stored in memory 150 to RAM 130 and carries out process of each kind in cooperation with a program developed in RAM 130. The main part performing the procedure is represented by control means 111.

The operating section 120 is a touch panel operating section structured integrally with, for example, display section 140, and accepts touch input from users at display section 140, and transmits the input signal to CPU 110. Operating section 120 can be an independent operating section from display section 140 with keys of each kind. RAM 130 has a work area storing said designated program, indication of input, input data and the result of process, and it stores information temporally.

The display section 140 is equipped with a display screen section such as LCD (Liquid Crystal Display) and, for example, structured as a touch panel display with operating section 120. Display section 140 displays a screen image according to display signal coming from CPU 110.

The memory 150 previously stores programs and data of each kind and can be written in, and composed of, for example, ROM (Read Only Memory), a flash memory and a hard disk. Interface section 160 is structured by a network card for communicating with outer apparatuses and so on and deals communication with the outer apparatuses.

Figure 4:
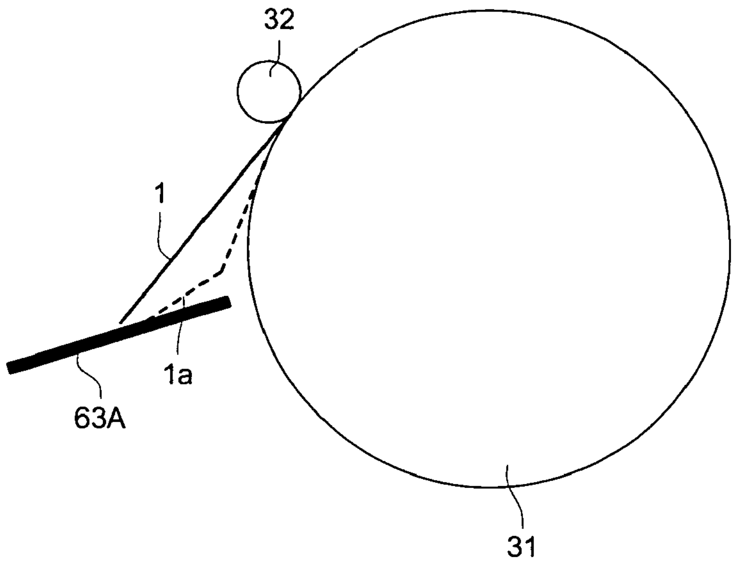
FIG. 4 is a diagram explaining the first creating factor of density unevenness.
Figure 5:
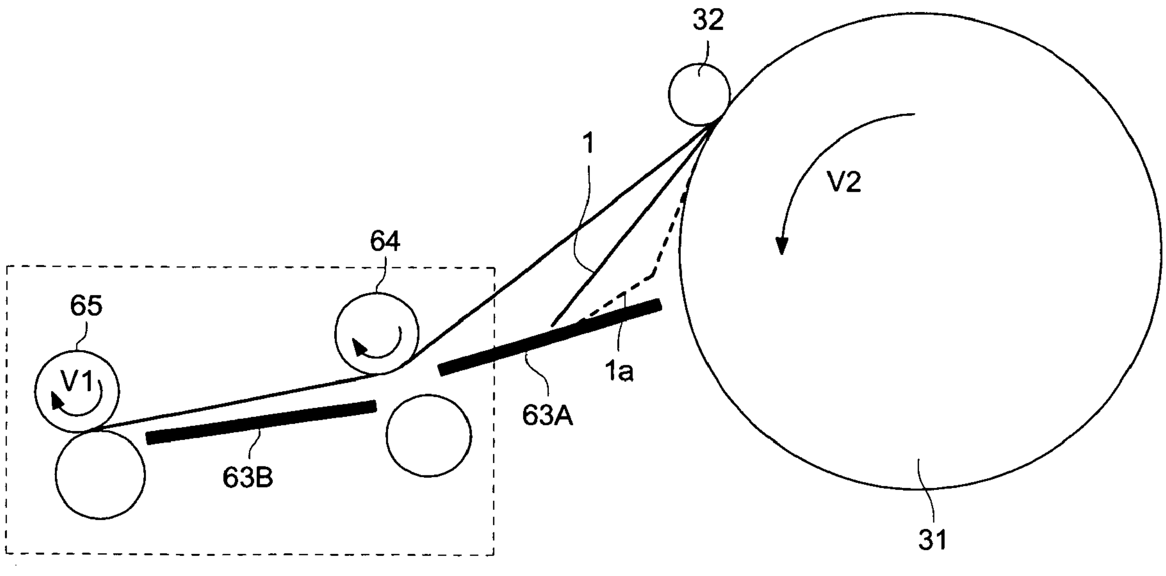
FIG. 5 is a diagram explaining the second creating factor of density unevenness.

Next, an explanation will be given about factors in creating unevenness of density on the leading edge and the trailing edge of film 1 in the transporting direction under exposure of a constant amount referring to FIGS. 4 and 5. First, the first creating factor of density unevenness will be explained referring to FIG. 4. FIG. 4 shows a view explaining the first creating factor of unevenness of density.

When film 1 is exposed by exposure means 2 and the film 1 is heat-developed by heat developing means 3 to record an image, if the exposure amount is constant, the more heat quantity and the more heating time film 1 gets, the darker (higher density) it becomes, and the earlier cooling timing and the higher cooling speed film 1 gets, the lighter (lower density) it becomes.

As shown in FIG. 4, in medical image recording apparatus 1α, heat roller 31 is driven to rotate by driving motor 33, and transports film 1 after exposure while it heats the film 1. The leading edge of film 1 which has passed through the nipping points of opposed rollers 32 and heating roller 31 reaches guide plate 63A. Thereafter, the film 1 starts to take a trace 1*a* gradually by receiving resistance from guide plate 63A. Specifically, a part other than the leading edge of film 1 contacts guide 63A earlier and longer than the leading edge of film 1.

Because film 1 is only cooled down after detachment of the film 1 from heat roller 31, if this transportation trace and transportation time are constant, no unevenness of the density of film 1 occurs, however the behavior of the leading edge of film 1 around guide plate 63A is not constant. At this point, though there is little influence from the size (aspect ratio), there is an influence of production such as a burr, projections, the direction of spreading made at the cutting stage and the direction of curl before the cutting, and there is a possibility that the transportation trace is not constant.

The trailing edge of the film 1 drops rapidly on guide plate 63A under the gravitation after detachment from heat roller 31 and it also can be a cause of variety of transportation time and a transportation trace.

The above-stated factor in creating uneven density on the leading edge and the trailing edge of the film 1 in the transportation direction is called the first creating factor. Especially, it appears clearly when it is not of a structure which keeps pulling force (it will be explained later) by having guide roller 64 and transporting roller 65.

Next, the second creating factor of density unevenness on the leading edge and the trailing edge of film 1 will be explained referring to FIG. 5. An explanation will be given about a view explaining the second creating factor of density unevenness in FIG. 5.

Medical image recording apparatus 1α has a structure which keeps. pulling force to film 1 after heat development to prevent the creation of creases. Heat roller 31 is driven to rotate by driving motor 33 to transport film 1 after exposure while the film is heated. Film 1 which has passed through the nip points between opposed rollers 32 and heating roller 31, reaches the nip point of transporting roller 65 via guide plate 63A, guide roller 64 and guide plate 63B. The leading edge of the film 1 forms trace "1*a*".

The velocity V2 of heat roller 31 and the velocity V1 of transporting roller 65 satisfies a relation of V1>V2. For this reason, film 1 is pulled, and, the contacting pressure of the film 1 to guide plates 63A and 63B is weakened gradually on the middle portion of the film 1 in the transporting direction and eventually film 1 floats over from guide plates 63A and 63B. Specifically, cooling of film 1 by contacting guide plates 63A and 63B changes into atmospheric (air) cooling. After the trailing edge of film 1 in the transporting direction is released from heat roller 31, film 1 continues to be transported at velocity V1.

As stated above, the factor in creating density unevenness on the leading edge and the trailing edge of film 1 created by pulling force to film 1 is named the second creating factor. Especially the density on each of the leading edge and the trailing edge of film 1 is unstable compared to the middle portion of the film. Further, because velocity V1, velocity V2 and |V1−V2| also vary in each of apparatuses, the density is more unstable.

When film 1 is transported by the rotation of heat roller 31, the leading edge of film 1 hits the next opposed roller 32 and is pulled after an instant stop while it is transported from one of opposed rollers 32 to another. During the time before being pulled, the leading edge of film 1 does not contact heat roller 31 and the received heat quantity reduces. For this reason, on the leading edge of the film 1, there appears a low density portion of, at least, the length of pitch of opposed rollers 32. The factor in creating density unevenness on the leading edge and the trailing edge caused by opposed rollers 32 is named the third creating factor.

Figure 6:
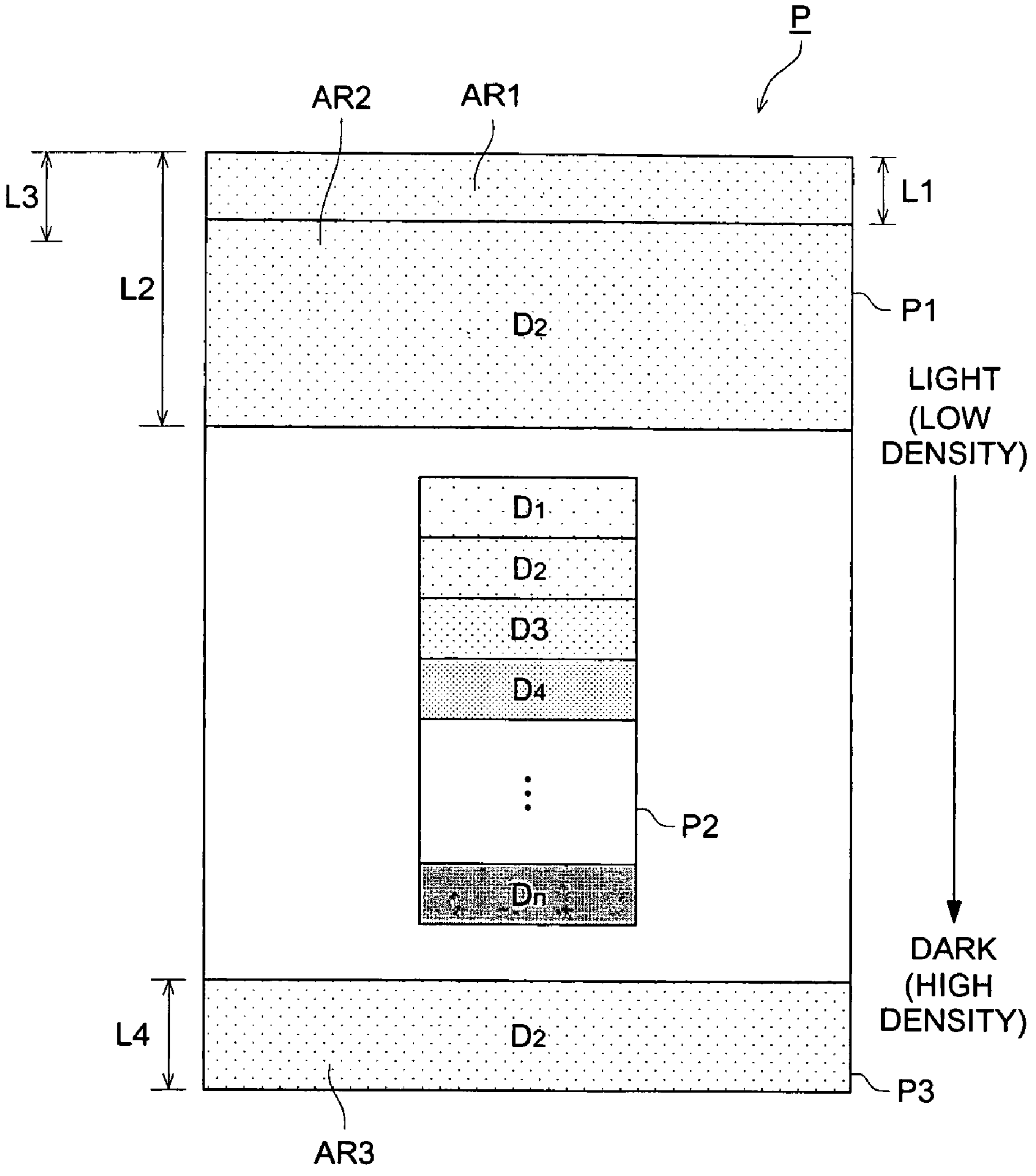
FIG. 6 is a diagram showing an example of testing exposure pattern P.

Next, an explanation will be given regarding a testing exposure pattern to be used for calibration of the embodiment, referring to FIG. 6. An example of testing exposure pattern P is shown in FIG. 6.

The testing exposure pattern P is a pattern of exposure amount corresponding to density pattern to be test-recorded on film 1 and it includes pattern P1 for the leading edge in the transporting direction of film 1, pattern P2 for the middle portion of film 1 and pattern P3 for the trailing edge of film 1. Pattern P2 is a step wedge of "n" steps ("n" is an natural number) for tone correction. Pattern P2 has density levels D1 through Dn and the closer the level goes to Dn from D1, the darker (higher density) it becomes.

Pattern P1 is a solid density portion having single density and the density of the portion is the same as one of density D1 through Dn of pattern P2. Here, for example, density D2 is employed for this. Pattern P3 is a solid density portion having single density and the density of the portion is the same as one of density D1 through Dn of pattern P2. Here, for example, density D2 is employed for this.

The reason to make pattern P2 correspond to the middle of film 1 is that an important part of a medical image for diagnosis tends to come to the middle portion and heat development characteristic is stable compared to the leading edge and the trailing edge of film 1.

The area on the leading edge of film 1 corresponding to the density unevenness created by the third creating factor is represented by area AR1, the area on the leading edge of film 1 corresponding to the density unevenness created by the first through the third creating factors excluding the area AR1 is represented by AR2, and the area on the trailing edge of film 1 corresponding to the density unevenness created by the first through the third creating factors is represented by AR3. The length of area AR1 in the transporting direction is represented by L1, the length of (area AR1+area AR2) in the transporting direction is represented by L2, the length of area on the leading edge in the transporting direction, where density unevenness occurs by the first creating factor is represented by L3 and the length of area AR3 in the transporting direction is represented by L4.

For example, length L1 is sufficient if it is at least as long as the length of a correction area in the transporting direction on the leading edge of film 1 corresponding to density unevenness created by the third creating factor. Length L2 is sufficient if it is at least as long as the length of a correction area in the transporting direction on the leading edge corresponding to density unevenness created by the first through the third creating factors. Length L4 is sufficient if it is at least as long as the length of a correction area in the transporting direction on the trailing edge corresponding to density unevenness created by the first through the third creating factors. The correction area on the leading edge or the trailing edge is an area where a correction for the leading edge or the trailing edge of film 1 is carried out when images of image data for diagnosis are recorded. For example it is structured to satisfy Length L1 or Length (L1−L2)>>Length L3≧Pitch of opposed roller 32.

It can be structured to have different density between area AR1 and area AR2. In this structure, it is preferable that the density of area AR1 is lower than that of area AR2 and the density of area AR2 is the same as that of area AR3. For example, the density of area AR1 can be lower than that of area AR2 by one step of pattern P2. For example, the density of area AR1 may be density D1 and the density of area AR2 and AR3 may be density D2. It may be structured so that the density of area AR2 is different from that of area AR3.

Figure 7:
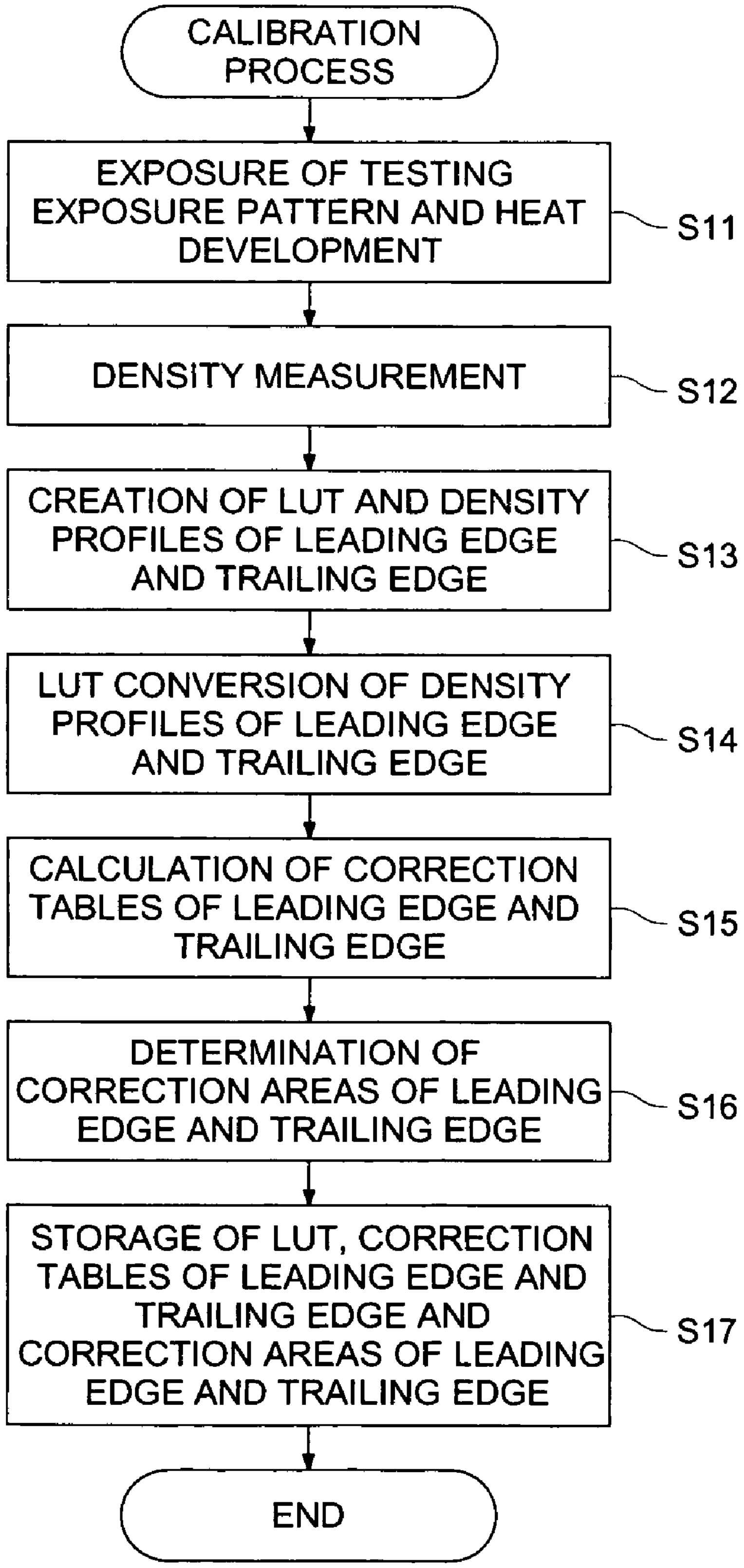
FIG. 7 is a flowchart showing calibration process.

Next, the operations of medical image recording apparatus 1α will be explained referring to FIG. 7 through FIG. 11. In FIG. 7, the calibration process is shown. In this example, it is assumed that patterns P1 and P3 have the same density (D2). However, the embodiment is not limited to this. Testing exposure pattern P is explained to include pattern P1 and Pattern P3, however it is also possible to arrange to include only one of them.

First, there will be explained the calibration process which is carried out by using one sheet of film before recording of a medical image so as to correct the density recording characteristics of medical image recording apparatus 1α, referring to FIG. 7. In medical image recording apparatus 1α, for example, input of execution indication from operating section 120 by an operator triggers CPU 110 to execute an calibration process in cooperation with calibration program which has been read out of memory 150 and has been developed in RAM 130.

First, data of testing exposure pattern P are read out of memory 150 and unrecorded film 1 sent by film transporting means 6 is exposed to testing exposure pattern P by exposure means 2, and further, the exposed film 1 is heated and heat-developed by heat developing means 3 (Step 11). Next, the density of film 1 where testing exposure pattern P has been heat-developed is measured by density measuring means 7 (Step S12). The density of each of patterns P1, P2 and P3 on film 1 is measured.

Figure 8:
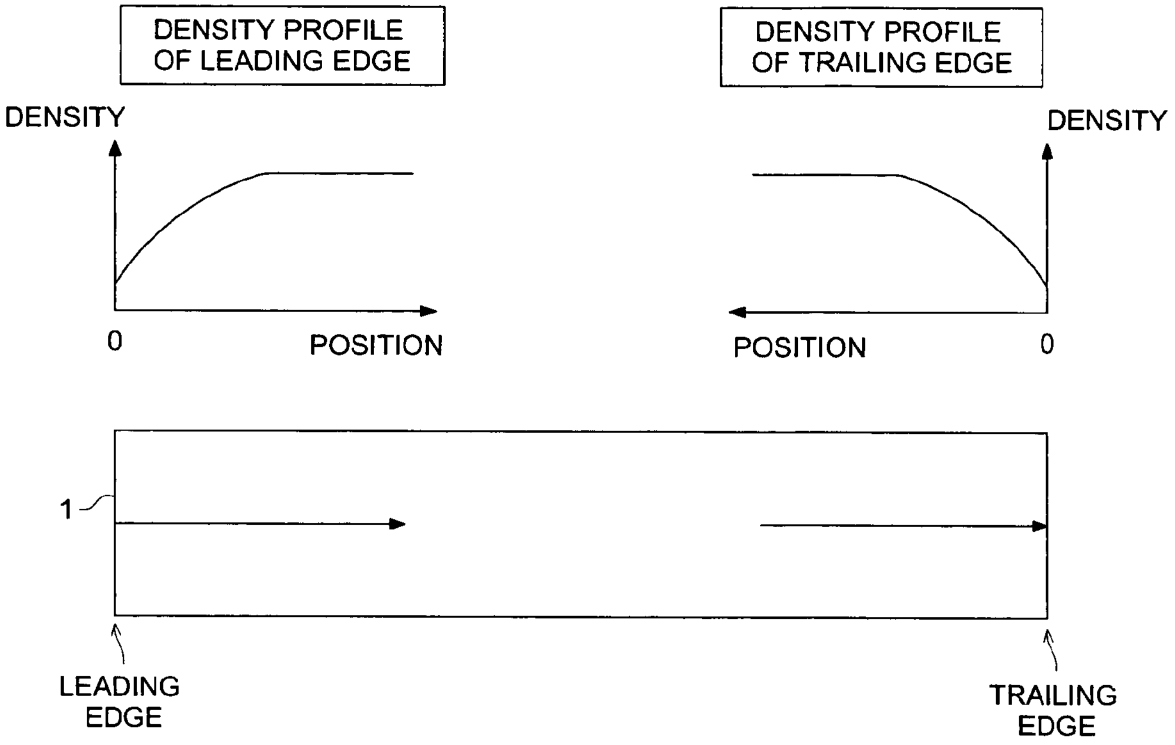
FIG. 8 is a diagram showing an example of density measurement for the leading edge and the trailing edge of film 1.

And then, based on the result of measurement of density of pattern P2, LUT (Look up table) representing the relationship between exposure amount (LD value) and diagnostic image data (density data (of image data)) is created for tone correction, and based on the result of measurement of density of pattern P1, a density profile of the leading edge is created, and then, based on the result of measurement of density of pattern P3, a density profile of the trailing edge is created (Step S13). FIG. 8 shows an example of density measurement for the leading edge and the trailing edge of film 1. As shown in FIG. 8, based on the result of density measurement of pattern P1, a density profile of the leading edge representing relationship between the density and the position (distance) from the leading edge of film 1 is created corresponding to pattern P1. Based on the result of density measurement of pattern P3, a density profile of the trailing edge representing relationship between the density and the position (distance) from the trailing edge of film 1 is created corresponding to pattern P3.

Figure 9:
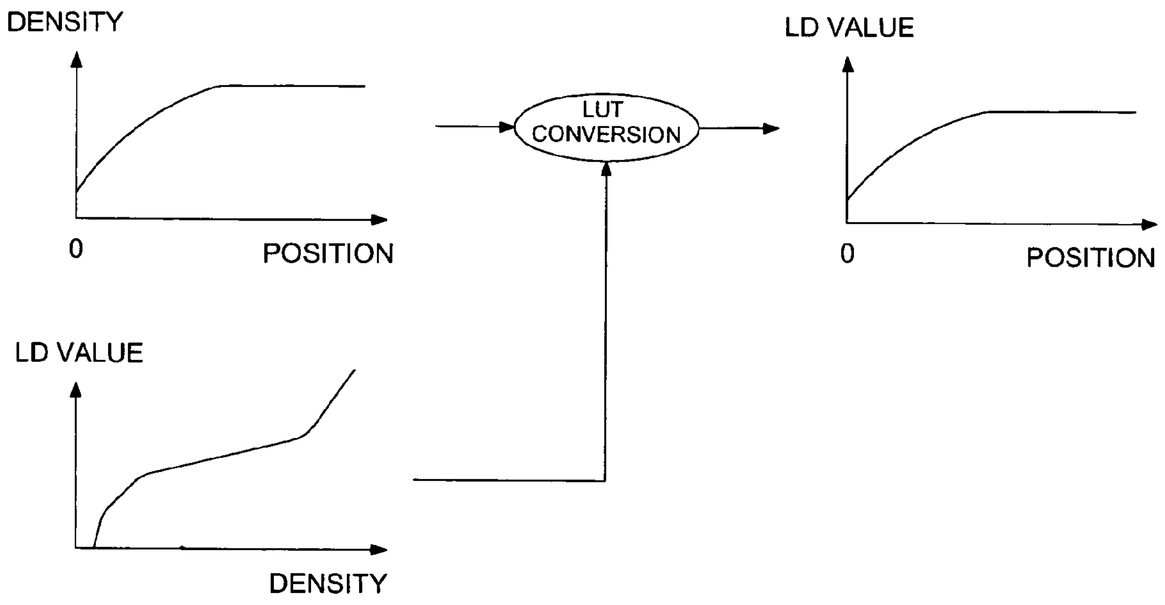
FIG. 9 is a diagram showing an example of calculation of the relationship between the position from the leading edge of film 1 and the exposure amount.

LUT conversion by using LUT created in Step 13 is applied to the density profile of the leading edge and the density profile of the trailing edge which have been created in Step 13, and the relationship between the exposure amount and the position of film 1 in the transporting direction is calculated (Step S14). FIG. 9 shows an example of calculation of relationship between the exposure amount and the position (distance) from the leading edge of film 1. For example, as shown in FIG. 9, LUT conversion is applied to a density profile of the leading edge and the relationship between the exposure amount and the position (distance) from the leading edge of film 1 is calculated.

Figure 10:
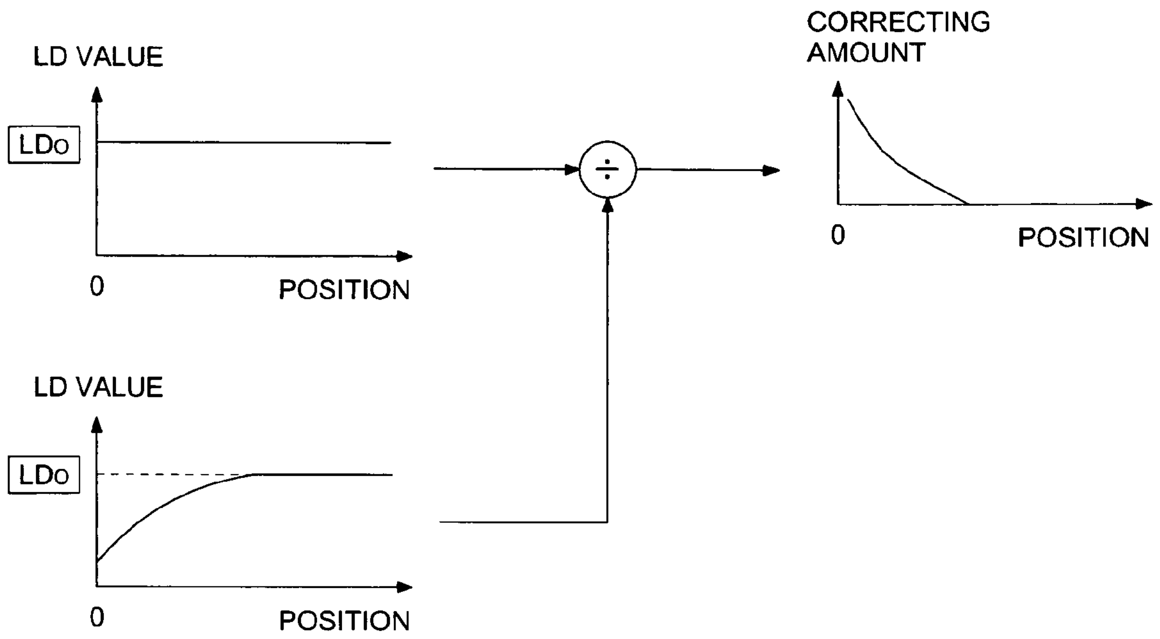
FIG. 10 is a diagram showing an example of calculation for a correction table of leading edge.

Based on the relationship between the exposure amount and the position in the transporting direction of film 1, which has been calculated in Step S14, and on standard density of patterns P1 and P3, a correction table of the leading edge and a correction table of the trailing edge showing the relationship between the exposure amount and the position in the transporting direction, are calculated (Step S15). FIG. 10 shows an example of calculation of a correction table of the leading edge. For example, as shown in FIG. 10, a correction table of the leading edge can be obtained by means of dividing standard exposure amount $LD_0$ which is constant at every position in the transporting direction of film 1 (in the example in FIG. 8, it corresponds to density D2) by the relationship of the exposure amount to the position (distance) from the leading edge of film 1. Density D2 corresponding to standard exposure amount $LD_0$ is included as one of plural density levels D1 through D2 in pattern P2, and the standard exposure amount (standard density) can be obtained easily based on the measurement result of density D2 in pattern P2.

Based on the result of density measurement of patterns P1 and P3 and the result of density measurement of pattern P2, the correction areas on the leading edge and the trailing edge of film 1 are determined (Step S16). And then, LUT calculated in Step S13, correction tables for the leading edge and the trailing edge calculated in Step S15 and correction areas for the leading edge and the trailing edge of film 1 calculated in Step 16 are stored in memory 150 (Step S17) to finish the calibration process.

Figure 11:
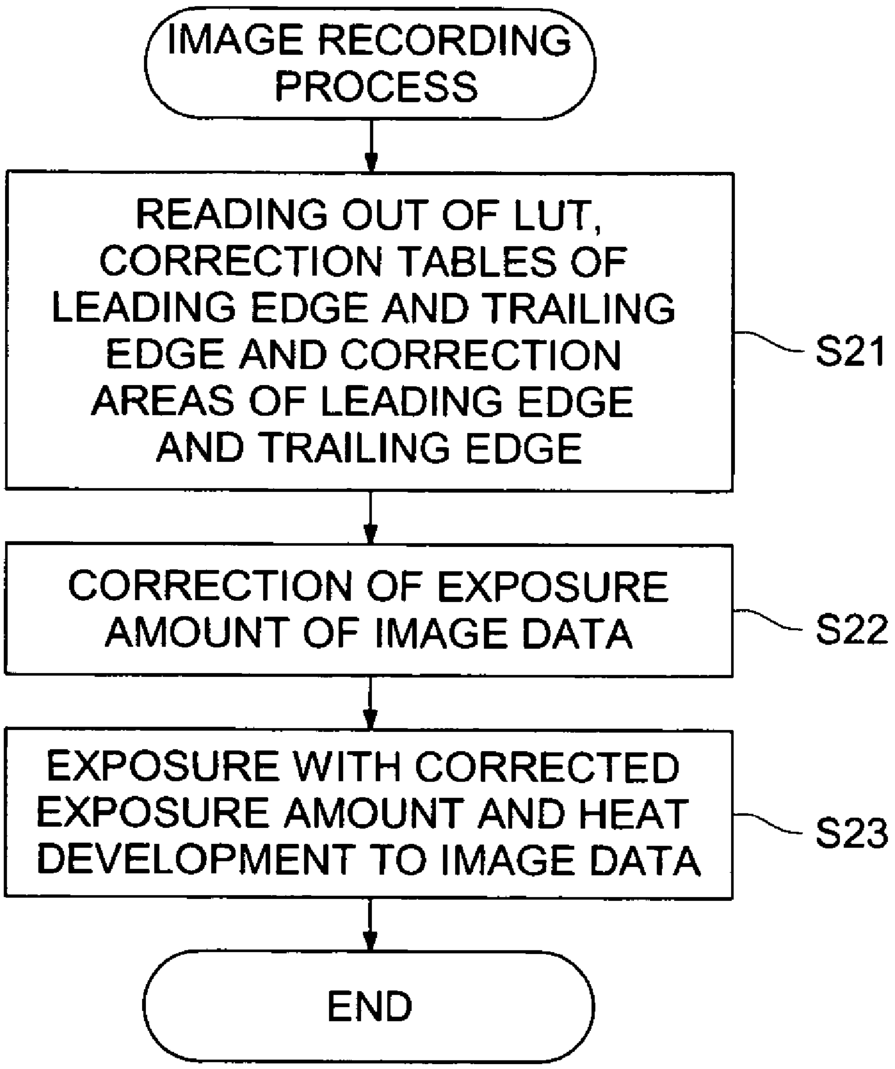
FIG. 11 is a flowchart showing the image recording process.

Next, an image recording process recording medical images will be explained by using LUT created in aforementioned calibration process, a correction table for the leading edge, a correction table for the trailing edge and correction areas for the leading edge and the trailing edge of film 1, in medical image recording apparatus 1α, referring to FIG. 11. FIG. 11 shows an image recording process.

In medical image recording apparatus 1α, for example, input of execution instruction for image recording from operating section 120 by an operator or reception of execution instruction for image recording via interface section 160 from outer apparatuses triggers CPU 110 to execute an image recording process in cooperation with image recording program which has been read out of memory 150 and has been developed in RAM 130.

Previously, image data of a medical image is created after photographing diseased parts of patients with photographing apparatus which is not illustrated. In medical image recording apparatus 1α, control means 111 receives image data created by photographing from outer equipments such as photographing apparatus and its controlling apparatus, and stores them in memory 150.

First, LUT, the correction table of the leading edge, the correction table of the trailing edge and the correction areas of the leading edge and the trailing edge of film 1 are read out of memory 150 (Step S21). An image data to be recorded is read out of memory 150 and a tone correction is conducted to the exposure amount of the read-out image data based on LUD read out in Step 21 and the exposure amount of the read-out image data is corrected for the correction areas on the leading edge and the trailing edge of the film 1, based on the correction table of the leading edge and the correction table of the trailing edge (Step S22).

Based on the exposure amount of image data which has been corrected in Step S22, unrecorded film 1 sent by film transporting means 6 is exposed by exposure means 2, and exposed film 1 is heated and heat-developed by heat-developing means 3 to create film 1 where image data have been recorded (Step S23) and the image forming process is completed.

In this embodiment, because film 1 is exposed, heat-developed and applied with density measurement based on testing exposure pattern P including pattern P1 and P3, and the density characteristics of the leading edge and the trailing edge of film 1 at the recording stage of diagnostic image data are corrected for the correction areas of the leading edge and the trailing edge of film 1 based on the result of the density measurement, thereby the correction areas of the leading edge and the trailing edge of heat developable photosensitive film 1 can be determined, and the density correction can be performed accurately and efficiently. Therefore, it is possible that the correction can be done with only one film.

By means of step wedge part of pattern P2 for tone characteristics measurement, tone characteristics can be corrected accurately at the image recording stage, and by means of the solid density parts of pattern P1 and pattern P3 for the leading edge and the trailing edge of a film, the density of the leading edge and the trailing edge of film 1 at the image recording stage can be corrected accurately.

Because correcting exposure amount of density characteristics of the leading edge and the trailing edge of film 1 is calculated based on a look up table for tone characteristics correction, the density of the leading edge and the trailing edge of film 1 at the image recording stage can be corrected accurately based on the correcting exposure amount.

Because the density characteristics of the leading edge and the trailing edge of film 1 are corrected comparing the result of density measurement of the leading edge and the trailing edge of film 1 with the result of density measurement of a pattern with the same density in step wedge of pattern P2 in the middle of the film, a difference (correcting amount of density) from the ideal density (the density to be recreated) can be detected and the density correction for the leading edge and trailing edge of film 1 can be done more accurately.

The correction areas on the leading edge and the trailing edge of the film 1 can be determined based on the heat development characteristic of heat developing means 3, and the density correction for the leading edge and/or the trailing edge of film 1 can be done more accurately.

It has been known that the density characteristics of image recording performed by heat development relates to the multiplicity of exposure. The multiplicity of exposure is, for example, a parameter affected by an overlap level of an irradiated beam in the sub scanning direction (transporting direction) of exposure. It is also possible to employ a structure wherein, when one correction value of calibration (LUT, a correction table of the leading edge and a correction table of the trailing edge) of the multiplicity is created, another correction value of calibration of another multiplicity may be calculated from the correction value of calibration of multiplicity by using the characteristics of this exposure multiplicity.

The embodiment described above is one of examples of preferable medical image recording apparatuses related to this invention, however the invention is not limited to this. Regarding detailed structure and detailed operations of each constituent component of the medical image recording apparatus of the aforementioned embodiment, it is naturally possible to change them properly without departing from the spirit and scope of this invention.

Data of testing exposure pattern P of medical image recording apparatus 1α are recorded on a recording medium such as film 1 after they are visualized, however they may also be recorded on a recording medium such as a CD-R as digital data for preservation of the data.

LUT, a correction table of the leading edge or a correction table of the trailing edge is not limited to be one which calculates all correction values. For example, after calculation of, at least, two correction values, other correction values can be calculated by using a linear interpolation or a nonlinear interpolation method for the values already calculated.

The above-stated density correction can be applied to films of a plurality of different sizes by determining the correction areas and the correcting exposure amount for each film size individually. In this case, medical image recording apparatus 1α obtains and keeps data of the correction areas and the correcting exposure amount corresponding to each film size, and therefore, more constant density of the leading edge and the trailing edge for films of different sizes can be obtained by the density correction based on the data.

When the size of film 1 is considered, there is a case in which all of P1, P2 and P3 can not be included in testing exposure pattern P. In this case, it is also possible to employ an arrangement to omit pattern P3 wherein an area where unevenness of density is smaller, compared to pattern P1.

In the aforementioned embodiment, though correction areas for the leading edge and trailing edge are determined simultaneously with the calibration process, the invention is not limited to this case. In medical image recording apparatus 1α, for example, calibration process is structured so that the correction areas of the leading edge and trailing edge of film 1 are not determined by the calibration process, and after the completion of the calibration, film 1 is exposed, heat-developed and applied with density measurement based on image data of a whole or partial solid portion having prescribed single density, and then the correction areas of the leading edge and trailing edge of film 1 are determined based on the result of the density measurement. In this case, it is preferable that the determination of the correction areas is done as soon as possible after the calibration process.

Figure 12:
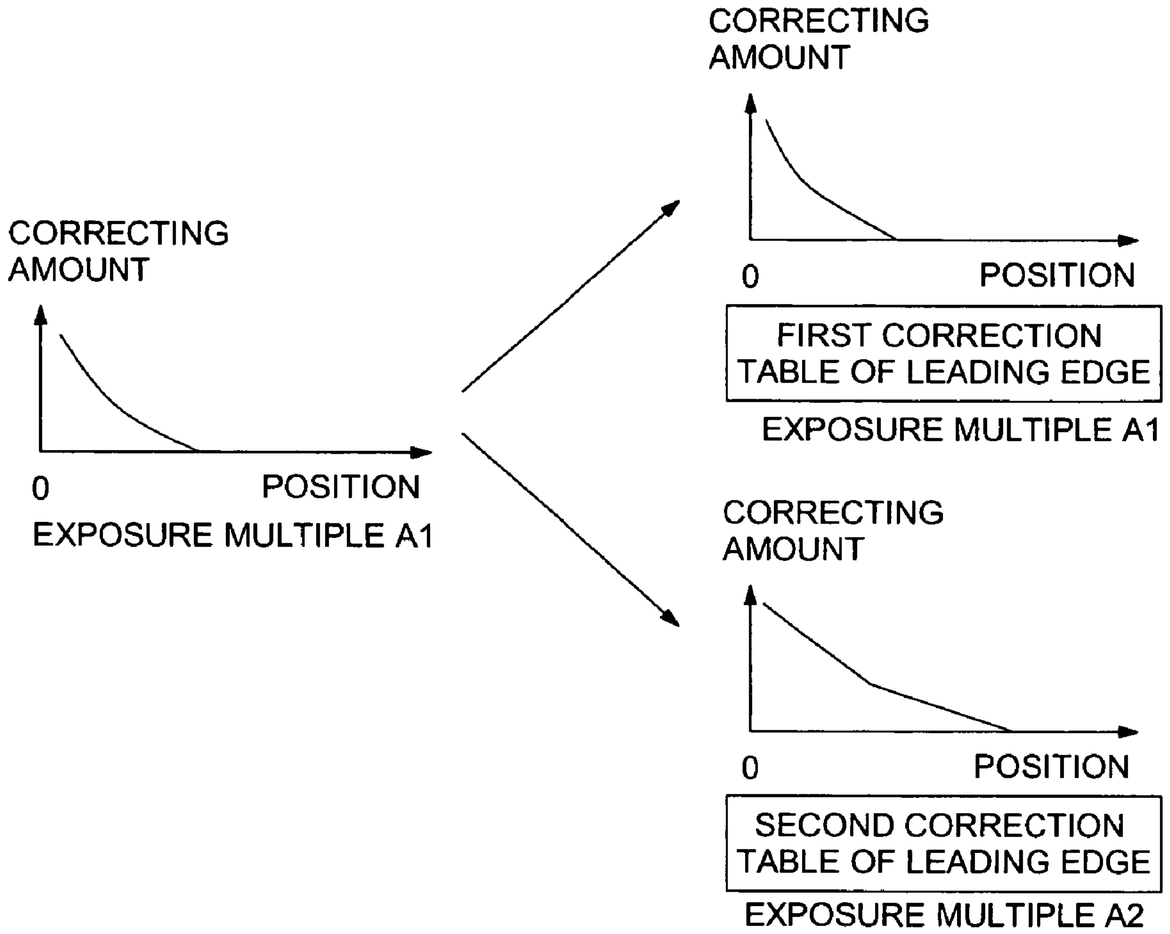
FIG. 12 is a diagram showing an example of creation of correction table of the leading edge having a different exposure multiplicity.

Examples of creation of correction tables of the leading edge which have different exposure multiplicity are shown in FIG. 12. As shown in FIG. 12, for example, when a correction table of the leading edge of exposure multiplicity A1 is obtained by calibration process, it is possible to arrange so that the first correction table of the leading edge corresponding to exposure multiplicity A1 (intact value) and the second correction table of the leading edge corresponding to exposure multiplicity A2 (changed value) are created based on the characteristics of exposure multiplicity.

By means of this structure, calibration correction values of plural exposure multiplicity can be created from a calibration correction value obtained by one calibration process and execution load for calibration can be lightened, and cost for calibration can be reduced by reducing the cost of films for calibration.

What is claimed is:

1. A medical image recording apparatus, comprising:

a film transporting device to transport a heat developable photosensitive film one at a time;

an exposing device to form a latent image on the film based on predetermined testing exposure data or diagnostic image data;

a heat developing device to heat-develop the latent image on the film, for visualizing the latent image;

a density measuring device to measure the density of the visualized image after the heat development; and a controlling device to control the film transporting device, the exposing device, the heat developing device and the density measuring device;

wherein the testing exposure data comprise first test data to form a first test image on at least one of a leading edge portion and a trailing edge portion of a film, the exposing device forms a latent image of the first test image based on the first test data, the heat developing device visualizes the first test image, the density measuring device measures the density of the first test image on the film and the controlling device determines a correction area on the at least one of the leading edge portion and the trailing edge portion of the film based on the result of the density measurement of the first test image and corrects the density characteristic of an area of another film corresponding to the determined correction area when a medical image is recorded on the another film based on diagnostic image data, and wherein the testing exposure data further includes another test data to form another test image for correction of a whole area of the film.

2. The medical image recording apparatus described in claim 1, wherein the testing exposure data comprise second test data including test data to form a second test image having the same density with the first test image for detecting a density change on the at least one of the leading edge portion and the trailing edge portion of the film, the second test image is formed in a middle portion of the film, and the controlling device corrects the density characteristic of the at least one of the leading edge portion and the trailing edge portion of the another film based on the comparison of the result of density measurement of the first test image on the film and the result of the density measurement of the second test image on the film.

3. The medical image recording apparatus described in claim 2, wherein the second test data comprise a plurality of wedge pattern data to form wedge pattern images for measurement of tone characteristics.

4. The medical image recording apparatus described in claim 3, wherein the controlling device creates a look up table for correction of tone characteristics based on the result of the density measurement of the wedge pattern images and calculates a correcting exposure amount of the density characteristic of the at least one of the leading edge portion and the trailing edge portion of the film based on the look up table.

5. The medical image recording apparatus described in claim 1, wherein the first test data comprise third test data to form a third test image on the leading edge portion and fourth test data to form a fourth test image next to the third test image, and the density of the third test image is lower than that of the fourth test image.

6. The medical image recording apparatus described in claim 1, wherein the correction areas on the at least one of the leading edge portion and the trailing edge portion of the film are determined based on heat developing characteristic of the heat developing device.

7. The medical image recording apparatus described in claim 1, wherein the medical image recording apparatus is adapted to record an image selectively on one of plural different sizes of heat developable photosensitive films, and wherein the controlling device determines the correction areas and correcting exposure amount for each film of different sizes respectively such that the density of each of the plural different sizes of heat developable photosensitive films is corrected.

8. A method of correcting a medical image, comprising steps of:

forming a latent image of a first test image on at least one of a leading edge portion and a trailing edge portion of a heat developable photosensitive film based on first test data of testing exposure data;

conveying the film to a heat developing device;

developing the film for visualizing the first test image;

measuring the density of the first test image on the film;

determining a correction area on the at least one of the leading edge portion and the trailing edge portion of the film based on the result of the density measurement of the first test image; and correcting the density characteristic of an area of another film corresponding to the determined correction area when a medical image is recorded on the another film based on diagnostic image data, wherein the testing exposure data further includes another test data to form another test image for correction of a whole area of the film.

9. The medical image correcting method described in claim 8, wherein the testing exposure data comprise second test data including test data to form a second test image having the same density with the first test image for detecting a density change on the at least one of the leading edge portion and the trailing edge portion of the film, the second test image is formed in a middle portion of the film in the forming step, and the density characteristic of the at least one of the leading edge portion and the trailing edge portion of the another film is corrected based on the comparison of the result of density measurement of the first test image on the film and the result of the density measurement of the second test image on the film.

10. The medical image correcting method described in claim 9, wherein the second test data comprise a plurality of wedge pattern data to form wedge pattern images for measurement of tone characteristics.

11. The medical image correcting method described in claim 9, wherein a look up table for correction of tone characteristics is created based on the result of the density measurement of the wedge pattern images and a correcting exposure amount of the density characteristic of the at least one of the leading edge portion and the trailing edge portion of the film is calculated based on the look up table.

12. The medical image correcting method described in claim 8, wherein the first test data comprise third test data to form a third test image on the leading edge portion and fourth test data to form a fourth test image next to the third test image, and the density of the third test image is lower than that of the fourth test image.

13. The medical image correcting method described in claim 9, wherein the correction areas on the at least one of the leading edge portion and the trailing edge portion of the film are determined based on heat developing characteristic of the heat developing device.

14. The medical image correcting method described in claim 8, wherein an image is recorded selectively on one of plural different sizes of heat developable photosensitive films, and wherein the correction areas and correcting exposure amount are determined for each film of different sizes respectively such that the density of each of the plural different sizes of heat developable photosensitive films is corrected.

15. A computer readable recording medium readable by a computer and for storing predetermined data of testing exposure data to be recorded on a heat developable photosensitive film, the testing exposure data comprising:

first test data to form a first test image for detecting the density characteristics of at least one of a leading edge portion and a trailing edge portion of a heat developable photosensitive film;

second test data including test data to form a second test image having the same density with the first test image, wherein the second test image is formed in a middle portion of the film;

the first test data including third test data to form a third test image on the leading side and fourth test data to form a fourth test image next to the third test image, wherein the density of the third test image is lower than the density of the fourth test image.

16. The recording medium described in claim 15, wherein the testing exposure data comprise plural wedge pattern data for measuring tone characteristics.

17. The recording medium described in claim 16 wherein the plural wedge pattern data comprise the test data having the same density with the first test image for measurement of density change of the at least one of the leading edge portion and the trailing edge portion of the film.

* * * * *